United States Patent [19]

Kuwata et al.

[11] Patent Number: 5,092,922
[45] Date of Patent: Mar. 3, 1992

[54] POLISHING AGENT

[75] Inventors: Satoshi Kuwata; Koji Sakuta, both of Annaka, Japan

[73] Assignee: Shin-Etsu Chemical Co., Ltd., Tokyo, Japan

[21] Appl. No.: 472,229

[22] Filed: Jan. 30, 1990

[30] Foreign Application Priority Data

Jan. 31, 1989 [JP] Japan .................... 1-22000

[51] Int. Cl.$^5$ .............................................. C09G 1/18
[52] U.S. Cl. ........................................ 106/3; 106/12; 106/287.14; 106/287.15; 106/287.13
[58] Field of Search ........... 106/3, 12, 287.14, 287.15, 106/287.13

[56] References Cited

U.S. PATENT DOCUMENTS

| | | | |
|---|---|---|---|
| 3,529,007 | 9/1970 | Brison et al. | 106/12 |
| 3,544,498 | 12/1970 | Holdstock et al. | 106/3 |
| 3,960,800 | 6/1976 | Kohl, Jr. | 106/287.13 |
| 4,028,298 | 6/1977 | Dumoulin et al. | 106/287.14 |
| 4,049,873 | 9/1977 | Creasey et al. | 106/287.13 |
| 4,380,367 | 4/1983 | Suzuki | 106/287.14 |
| 4,436,856 | 3/1984 | Huhn et al. | 106/287.14 |

Primary Examiner—Mark L. Bell
Assistant Examiner—Helene Klemanski
Attorney, Agent, or Firm—Oblon, Spivak, McClelland, Maier & Neustadt

[57] ABSTRACT

A polishing agent comprising a composition prepared by mixing
(I) a polymerization product obtained by addition polymerization of a particular organohydrogenpolysiloxane and a particular organopolysiloxane having silicon-bonded aliphatic unsaturated bonds, in the presence of from 10 to 200 parts by weight of a low-viscosity silicone oil per 100 parts by weight of the total amount of said organohydrogenpolysiloxane and said organopolysiloxane; and
(II) a low-viscosity oil with a viscosity of not more than 10 cSt at 25° C. This polishing agent has good durable water-resistance as well as has good workability in coating operation, and therefore is suited to cars, furniture and so forth.

15 Claims, No Drawings

POLISHING AGENT

BACKGROUND OF THE INVENTION

1. Field of the Invention

The present invention relates to a polishing agent.

2. Description of the Prior Art

As polishing agents that are coated on surfaces of cars, furniture, etc. for giving brightness thereto, emulsion type ones and oily type ones are heretofore known.

Of these, the emulsion polishing agents are pasty or creamy and have a suitable softness (normally, have a viscosity of 1,000 cP or more at 25° C.), and therefore they are very easy to apply and have good workability in application. The oily polishing agents are in the form of solid, slightly soft paste or liquid, and have good durable water-resistance.

However, the emulsion polishing agents have poor durable water-resistance owing to a surfactant contained therein as an emulsifying agent. Therefore, in particular, they are not satisfactory as a polishing agent for cars. On the other hand, the oily polishing agents have following disadvantages. The solid ones or slightly soft and pasty ones have poor coverability or spreadability and therfore have poor workability in coating operation; the liquid ones are liable to drip from the surfaces on which they are applied. In addition, it has been impossible to prepare an oily polishing agent having a softness suited to coating operation, because there is not known a suitable thickening agent that can be used to increase the viscosity of the low-viscosity oil used as a solvent, to an appropriate level.

SUMMARY OF THE INVENTION

Accordingly, an object of the present invention is to provide a polishing agent having good durable water-resistance and also having a softness suited to coating operation.

As disclosed herein, as a means for solving the problems involved in the prior art, this invention provides a polishing agent comprising a composition prepared by mixing (I) a polymerization product obtained by addition polymerization of an organohydrogenpolysiloxane of (A) given below and an organopolysiloxane of (B) given below, in the presence of from 10 to 200 parts by weight of a low-viscosity silicone oil of (C) given below per 100 parts by weight of the total amount of said organohydrogenpolysiloxane of (A) and said organopolysiloxane of (B);

(A): an organohydrogenpolysiloxane containing in its molecule not less than 1.5 silicon-bonded hydrogen atoms on average;

(B) an organopolysiloxane containing in its molecule not less than 1.5 silicon-bonded aliphatic unsaturated groups on average;

(C) a low-viscosity silicone oil with a viscosity of not more than 100 cSt at 25° C., and (II) a low-viscosity oil with a viscosity of not more than 10 cSt at 25° C.

The polishing agent of this invention has good durable water-resistance as well a has good workability in coating operation because of its viscosity suitable for the operation. Therefore, the polishing agent is suited to cars, furniture and so forth.

DETAILED DESCRIPTION OF PREFERRED EMBODIMENTS OF THE INVENTION

(I) Polymerization Product

The polishing agent of this invention comprises a composition prepared by mixing Components (I) and (II) described above. The polymerization product of (I) can be prepared by subjecting the reactive organopolysiloxanes of (A) and (B) to addition polymerization in the presence of the low-viscosity silicone oil of (C). In the polymerization product thus obtained, the low-viscosity silicone oil of (C) has been incorporated in the three-dimensional crosslinked structure of the polymer formed.

(A) Organohydrogenpolysiloxane

The (A) organohydrogenpolysiloxane includes those comprising some or all of an $HSiO_{1.5}$ unit, an $RSiO_{1.5}$ unit, an RHSiO unit, an $R_2SiO$ unit, an $R_2HSiO_{0.5}$ unit and an $R_3SiO_{0.5}$ unit, wherein R is a substituted or unsubstituted monovalent hydrocarbon group except for an aliphatic unsaturated group, as exemplified by an alkyl group such as methyl, ethyl, propyl or butyl; an aryl group such as phenyl or tolyl; a monovalent hydrocarbon group including a cycloalkyl group such as cyclohexyl, and a substituted hydrocarbon group in which one or more hydrogen atoms possessed by the monovalent hydrocarbon group have been substituted with a halogen atom such as chlorine, bromine or fluorine, a cyano group, etc., as exemplified by a gamma-trifluoropropyl group and a chloromethyl group. This organohydrogenpolysiloxane may be linear, branched, or cyclic, but may more preferably be linear to make the addition polymerization smoothly proceed.

This organohydrogenpolysiloxane contains in its molecule not less than 1.5, and preferably 2 to 5, silicon-bonded hydrogen atoms (Si-H bonds) on average.

The silicon-bonded hydrogen atoms in the molecule preferably comprise from 0.5 to 50 mol %, and more preferably from 1 to 20 mol % of the total of the silicon-bonded hydrogen atoms and organic groups.

The organic groups (represented by R in the above) contained in the component (A) can include various groups, but are preferably the methyl group, and it is particularly preferred that not less than 50 mol % of R's is comprised of the methyl group.

Typical examples of the organohydrogenpolysiloxane of (A) include a compound represented by the formula:

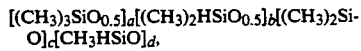

wherein a and b are each an integer of from 0 to 2, provided that $a+b=2$, c is an integer of from 0 to 500, and d is an integer of from 0 to 50.

(B) Organopolysiloxane

The organopolysiloxane of (B) contains in its molecule not less than 1.5, and preferably from 2 to 5, silicon-bonded aliphatic unsaturated groups on average. The aliphatic unsaturated group includes, for example, a vinyl group and an allyl group, but, in general, preferably a vinyl group. This organopolysiloxane includes, for example, those comprising some or all of an $(CH_2=CH)SiO_{1.5}$ unit an $RSiO_{1.5}$ unit, an $R(CH_2=CH)SiO$ unit, an $R_2SiO$ unit, an $R_2(CH_2=CH)SiO_{0.5}$ unit and an $R_3SiO_{0.5}$ unit (wherein R is as defined above).

The aliphatic unsaturated groups preferably comprise from 0.5 to 50 mol %, and more preferably from 1 to 20 mol %, of all the organic groups bonded to silicon atoms. The organic groups other than the aliphatic unsaturated groups are preferably the methyl group. It is particularly preferred that the methyl group comprises not less than 50 mol % of the organic groups other than the aliphatic unsaturated groups.

The molecular structure of the organopolysiloxane of (B) may be linear, branched or cyclic, but is more preferably linear to make the addition polymerization smoothly proceed.

Typical examples of the organopolysiloxane of (B) include a methylvinylpolysiloxane represented by the formula:

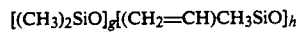

wherein e and f are each an integer of from 0 to 2, provided that $e+f=2$, g is an integer of from 0 to 500, and h is an integer of from 0 to 50. The organopolysiloxanes can be used singly or in combination of two or more.

As described above, in both of the anohydrogenpolysiloxane of (A) and the anopolysiloxane of (B), the number of the reactive groups, i.e., the silicon-bonded hydrogen atoms or aliphatic unsaturated groups, respectively, in the molecule is required to be not less than 1.5 on average. The number otherwise less than 1.5 for any one of them makes it difficult to form the three-dimensional structure in the polymer formed by addition polymerization.

The silicon-bonded hydrogen atoms and the silicon-bonded aliphatic unsaturated groups are preferably contained in an amount of from 0.8 to 50 mol % in the organohydrogenpolysiloxane of (A) and the organopolysiloxane of (B), respectively. If the content of either of these reative groups is more than 50 mol %, the polymer formed will have an excessively high crosslink density in the three-dimensional structure, so that the low-viscosity silicone oil of (C) can be incorporated into the three-dimensional structure with difficulty. As the result, the incorporation of the low-viscosity silicone oil is unstable and the oil may readily bleed on the surface of the polymerization product. On the other hand, if the content of either of the reactive groups is less than 0.5 mol %, the three-dimensional structure is formed in the polymer with difficulty.

In a more preferred embodiment, at least one of the organohydrogenpolysiloxane of (A) and the organopolysiloxane of (B) contains the reactive group, i.e.. the silicon-bonded hydrogen atoms or the silicon-bonded aliphatic unsaturated groups, in an amount smaller than 20 mol %. In this preferred embodiment, the degree of crosslinking of the polymer obtained is brought into a suitable state, and thus it is possible to obtain a composition that may cause the low-viscosity silicone of (C) to be incorporated in the polymer without bleeding out on the surface of the polymer. Consequently, the polymerization product of Component (I) can be obtained in the form of powder which is easy to work.

(C) Low-viscosity Silicone Oil

As the low-viscosity silicone oil of (C) used in this invention, any silicone oil can be used without any particular limitation so long as it has a viscosity of not more than 100 cSt at 25° C., preferably not more than 10 cSt. The use of a silicon oil having a viscosity of more than 100 cSt at 25° C. makes it difficult for the silicone oil to be retained in the three-dimensional structure of the polymer formed by the addition polymerization, and the silicon oil bleeds on the surface of the polymer. Thus, a uniform polymerization product can not be obtained.

The low-viscosity silicone oil may be linear, branched or cyclic. Examples of the low-viscosity silicone oil include siloxanes with a low degree of polymerization, including linear or branched ones such as methylpolysiloxane, methylphenylpolysiloxane, ethylpolysiloxane, ethylmethylpolysiloxane and ethylphenylpolysiloxane, and cyclic ones such as octamethylcyclotetrasiloxane and decamethylcyclopentasiloxane. One or more of them can be used under appropriate selection as desired.

Polymerization Conditions

The powder of the polymerization product of Component (I), which is used for production of the polishing agent of this invention, is prepared by subjecting the organohydrogenpolysiloxane of (A) and the organopolysiloxane of (B) to addition polymerization in the presence of the low-viscosity silicone oil of (C) under stirring. Here, the low-viscosity silicone oil is used in the amount ranging from 10 to 200 parts by weight, and preferably ranging from 20 to 100 parts by weight, based on 100 parts by weight of the total amount of the organohydrogenpolysiloxane of (A) and the organopolysiloxane of (B). If the amount of the low-viscosity silicone oil is less than 10 parts by weight, the polymerization product formed is hard and thereby incapable of thickening the low viscosity-silicon oil of Component (II), which is described later, to produce a polishing agent with a desired viscosity. If the amount of the low-viscosity silicone oil of (C) is over 200 parts by weight, it may bleed on the surfaces of the polymerization product, which is difficult to handle.

The organohydrogenpolysiloxane of (A) and the organopolysiloxane of (B) may be used in the above addition polymerization preferably in the range of the proportion such that the molar ratio of the silicon-bonded hydrogen atoms possessed by (A) to the silicon-bonded aliphatic unsaturated groups possessed by (B) is from 1/3 to 3/1, and more preferably from ½ to 2/1. If the above molar ratio is outside the range from ⅓ to 3/1, the stability of the polymerization product obtained may be impaired because unreacted components (i.e., silicon-bonded hydrogen atoms or silicon-bonded aliphatic unsaturated groups) remain therein.

The production of the polymerization product by the addition polymerization may be operated by, for example, in a reaction vessel such as a planetary mixer equipped with a suitable stirrer, charging the organohydrogen polysiloxane of (A), the organopolysiloxane of (B) and the low-viscosity silicone oil of (C), followed by further addition of a catalyst, and stirring the mixture at an appropriate temperature of from about 50° to about 150° C. As the polymeization proceeds, the reaction mixture gradually increase its viscosity, thereby turning from a liquid state through a soft mass, which is disintegrated, finally to a powdery state.

As the catalyst, a platinum compound or rhodium compound is used. The platinum compound includes, for example, chloroplatinic acid, alcohol-modified chloroplatinic acid, a chloroplatinic acid-vinylsiloxane complex, the platinum compounds used in hydrosilylation reaction as described in U.S. Pat. Nos. 3,159,601, 3,159,662 and 3,775,452, etc., which preferably include, for example, a complex compound of vinylsiloxane with a platinum compound, and further the same having been modified with alcohol. Among these, particularly preferred are the chloroplatinate described in Japanese Patent Publication (KOKOKU) No. 9969/1958, and a complex compound of vinylsiloxane with chloroplatinate.

The powder of the polymerization product thus obtained can be mixed as it is as a main component of the polishing agent with the low-viscosity oil of (II). However, before mixed with the oil of (II), the powder is preferably ground into fine powder by means of a grinding unit capable of applying shearing force, for example, a three-roll mill, a two-roll mill and a sand grinder.

The powder of the polymerization product of (I) is a white powder, free from any bleeding of the low-viscosity silicone oil of (C) on the surface, having a dry feeling, having a smooth feel, and provided with an appropriate degree of softness.

Component (II)

The polishing agent of this invention comprises a composition prepared by mixing (I) the powder of the polymerization product with (II) the low-viscosity oil having a viscosity of not more than 10 cSt at 25° C.

The kind of the low-viscosity oil of (II) is not limited, as long as the oil has a viscosity of not more than 10 cSt at 25° C. The oil having a viscosity of more than 10 cSt at 25° C. can not be mixed uniformly with said Component (I), the powder of the polymerization product, thereby producing a composition having poor coverability or spreadability and having a sticky feel.

The low-viscosity oil includes, for example, siloxanes with a low degree of polymerization, including linear or branched ones such as methylpolysiloxane, methylphenylpolysiloxane, ethylpolysiloxane, ethylmethylpolysiloxane, ethylphenylpolysiloxane, and cyclic ones such as octamethylcyclotetrasiloxane and decamethylcyclopentasiloxane; aliphatic hydrocarbon oils with a low viscosity such as ligroin, mineral spirit, kerosene, and isoparaffins. These may be used singly or in combination of two or more.

Preparation of Polishing Agent

The composition, the main ingredient of the polishing agent of this invention, can be prepared by mixing the low-viscosity oil of (II) with the polymerization product powder of (I) uniformly, optionally under heating at from 50 to 150° C., in a container equipped with a suitable stirrer, e.g., a planetary mixer.

The polishing agent of this invention usually contains, as a main ingredient, 50% by weight or more of the composition prepared as above. The polishing agent may optionally contain other gredients, for example, natural waxes such as carnauba wax, montan wax and beeswax; synthetic waxes such as Hoechst wax (supplied by Hoechst AG), Hiwax (supplied by Mitsui Petrochemical Industries. Ltd.). Castor wax (supplied by Kokura Gosei Kogyo K.K.) and San wax (supplied by Sanyo Chemical Industries, Ltd.); silicone oils such as methyl silicone oils, methylphenylsilicon oils, amino-modified silicones and fluorine-modified silicones; abrasive materials such as diatomaceous earth, silica and silicates; stabilizing agents; prefumes: dyes: and pigments.

EXAMPLES

This invention will be further described by way of Examples. These, however, by no means limit this invention. Viscosity set out below referes to the viscosity at 25° C., and "part(s)" denotes part(s) by weight.

Preparation Example 1

In a planetary mixer with an internal volume of about 5 liter, 650 % of trimethylsilyl-terminated dimethylmethylhydrogenpolysiloxane (average molecular weight:2.180; Si-H content:6.5 mol %), 549 % of dimethylvinylsilyl-terminated dimethylpolysiloxane (average molecular weight:930; vinyl group content:7.7 mol %) and 800 % of octamethylcyclotetrasiloxane (viscosity:2.3 cSt) were charged, stirred and mixed. In the resulting mixed solution, 0.5 % of a 2 % chloroplatinic acid solution in 2-propanol was added, and stirring was continued at 70° to 80° C. for 2 hours. A powdery white product endowed with softness was obtained. The powder product was ground by means of a three-roll mill to give a uniform white a powder (1).

The powder (1) has a particle diameter of about 100 to 500 μm, and has dry surfaces and a soft feel.

Preparation Example 2

In a planetary mixer with an internal volume of about 5 liter, 880 % of trimethylsilyl-terminated dimethylmethylhydrogenpolysiloxane (average molecular weight:2,340; Si-H content:4.5 mol %), 512 % of dimethylvinylsilyl-terminated dimethylpolysiloxane (average molecular weight:930; vinyl group content:7.7 mol %) and 597 g of phenyltris(trimethylsiloxy)silane (viscosity:3.8 cSt) were charged, stirred and mixed. In the resulting mixed solution, 0.5 % of a 2 % chloroplatinic acid solution in 2-propanol was added, and thereafter the same procedure as in Preparation Example 1 was repeated to produce a white powder (2).

Preparation Example 3

In a planetary mixer with an internal volume of about 5 liter, 660 % of dimethylhydrogensilyl-terminated dimethylpolysiloxane (average molecular weight:1,020; Si-H content:6.7 mol %), 1,135 g of trimethylsilyl-terminated dimethylmethylvinylpolysiloxane (average molecular weight:2.640; vinyl group content:4.2 mol %) and 199 g of trimethylsilyl-terminated dimethylpolysiloxane (viscosity:6 cSt) were charged, stirred and mixed. In the resulting mixed solution, 0.5 g of a 2 % chloroplatinic acid solution in 2-propanol was added, and thereafter the same procedure as in Preparation Example 1 was repeated to produce a white powder (3).

Examples 1 to 5

In each example, in a planetary mixer with a internal volume of 5 liter, a low-viscosity oil and an additive were charged as given in Table I, and then mixed by stirring under heating at 80° C. to form a uniform mixture. Subsequently, while stirring was continued, the powder (1), (2) or (3) obtained in the above Preparation Examples was added. The mixture was stirred at 80° C. for another one hour, and thereafter cooled to room temperature under stirring a polishing agent was thus prepared.

The viscosity of the polishing agents obtained was measured. The results are given in Table 1.

The polishing agents obtained in the Examples were all in the form of uniform and white paste. They exhibited markedly good spreadability when applied on painted steel plate. After left to stand for about 30 min., the applied polishing agent could be readily wiped off. The resulting surface had a coating excellent in water repellency and brightness.

The surface-treated painted steel plates thus obtained were left to stand outdoors for two months. However, the steel plates all retained water repellency at the same level as before.

TABLE 1

| Example | Low-Viscosity oil Kind | Amount (part) | Powder of polymerization Product No. | Amount (part) | Additive Kind | Amount (part) | Viscosity of polishing agent (cP), 25° C. |
|---|---|---|---|---|---|---|---|
| 1 | Octomethylcyclo-tetrasiloxane | 67 | (1) | 30 | KF96[1] (500 cSt) | 3 | 52000 |
| 2 | Octomethylcyclo-tetrasiloxane | 68 | (1) | 27 | KF96 (500 cSt) Carnauba wax (No. 2) | 3 2 | 23000 |
| 3 | Phenyltris(trimethyl-siloxy)silane Isoper M[2] | 36 36 | (2) | 23 | KF96 (100 cSt) Carnauba wax (No. 2) | 2 3 | 2100 |
| 4 | IP Solvent 2028[3] | 67 | (3) | 30 | KF96 (1000 cSt) | 3 | 65000 |
| 5 | Octomethylcyclo-tetrasiloxane Diphenylhexa-methyltrisiloxane[4] | 50 21 | (3) | 25 | Carnauba wax (No. 2) | 4 | 58000 |

Remarks:
[1]Dimethylpolysiloxane supplied by Shin-Etsu Chemical Co., Ltd.
[2]Isoparaffin (Viscosity: 3.1 cSt) supplied by Exxon Chemical Co., Ltd.
[3]Isoparaffin (Viscosity: 3.4 cSt) supplied by Idemitsu Petrochemical Co., Ltd.
[4]Viscosity: 7.5 cSt Comparative Example 1

A polishing agent was prepared in the same manner as in Example 1 except that dimethylpolysiloxane (KF96, 20 cSt, product of Shin-Etsu Chemical Co., Ltd.) was used as the low-viscosity oil.

The powder (1) was not swelled uniformly, and the polishing agent has a low viscosity of 280 cP.

Comparative Example 2

Powder (4) was prepared in the same manner as in Preparation Example 1, except that the octomethylcyclotetrasiloxane was not used.

Subsequently, a polishing agent was prepared in the same manner as in Example 1, except that the powder (1) was replaced with the powder (4). The powder (4) was not swelled uniformly, and the polishing agent obtained had a low viscosity of 120 cP.

Comparative Example 3

Preparation of a powder was attempted in the same manner as in Preparation Example 2, except that the amounts of the trimethylsilyl-terminated dimethylmethyl hydrogenpolysiloxane, the dimethylvinylsilyl-terminated dimethylpolysiloxane, and the phenyltris (trimethylsiloxy) silane were changed to 302 g, 176 g and 1,202 g, respectively. The resulting product was not a powder but an solid mass of irregular shape.

Subsequently, a polishing agent was prepared in the same manner as in Example 1, except that the powder (1) was replaced with the above solid mass.

The viscosity of the polishing agent obtained was measured to be as high as 43,000 cP, but the polishing agent contains gel-like residual substances and therefore lacked uniformity.

We claim:

1. A polishing agent comprising a composition prepared by
   (I) mixing (A) an organohydrogenpolysiloxane containing not less than 1.5 silicon-bonded hydrogen atoms on average; (B) an organopolysiloxane containing not less than 1.5 silicon-bonded aliphatic unsaturated groups on average; and (C) a low-viscosity silicone oil having a viscosity of not more than 100 cSt at 25° C., such that 10 to 200 parts by weight of said low-viscosity silicone oil (C) is mixed per 100 parts by weight of the total amount of said organohydrogenpolysiloxane (A) and said organopolysiloxane (B), then polymerizing the mixture by addition polymerization to obtain a powder; and
   (II) mixing said powder with a low-viscosity oil having a viscosity of not more than 10 cSt.

2. The polishing agent of claim 1, wherein said organohydrogenpolysiloxane of (A) contains in its molecule from 2 to 5 silicon-bonded hydrogen atoms on average, and said organopolysiloxane of (B) contains 2 to 5 silicon-bonded aliphatic unsaturated groups on average.

3. The polishing agent of claim 1, wherein the aliphatic unsaturated group contained in said organopolysiloxane of (B) is the vinyl group.

4. The polishing agent of claim 1, wherein the low-viscosity silicone oil of (C) is used in an amount of 20 to 100 parts by weight per 100 parts by weight of the total of said (A) and said (B).

5. The polishing agent of claim 1, wherein said organohydrogenpolysiloxane of (A) and said organopolysiloxane of (B) are used in amounts such that the molar ratio of the silicon-bonded hydrogen atoms possessed by the (A)/the silicon-bonded aliphatic unsaturated groups possessed by the (B) is in a range of from ⅓ to 3/1.

6. The polishing agent of claim 1, wherein said low-viscosity oil of the component (II) is selected from the group consisting of silicone oils and aliphatic hydrocarbon oils.

7. The polishing agent of claim 1, wherein said silicon-bonded hydrogen atoms are present in an amount of from 1 to 20 mol % of the total of the silicon-bonded hydrogen atoms and silicon-bonded aliphatic groups present in said organohydrogenpolysiloxane (A).

8. The polishing agent of claim 1, wherein said silicon-bonded aliphatic unsaturated groups are present in an amount of from 1 to 20 mol % of the total of the silicon-bonded organic groups present in said said organopolysiloxane (B).

9. A polishing agent, comprising a composition prepared by
(I) mixing (A) an organohydrogenpolysiloxane of the formula $$[R_3SiO_{0.5}]_a[R_2HSiO_{0.5}]_b[R_2SiO]_c[RHSiO]_d$$

wherein each group R is independently a member selected from the group consisting of $C_1$–$C_4$-alkyl, phenyl, tolyl, cyclohexyl, and $C_1$–$C_4$-alkyl substituted with a cyano group or one or more halogen atoms, a and b are each an integer of from 0 to 2, provided that $a+b=2$, c is an integer of from 0 to 500, and d is an integer of from 0 to 50, provided that $b+d\geq 2$, (B) an organopolysiloxane of the formula $$[R'R_2SiO_{0.5}]_e[R_3SiO_{0.5}]_f[R_2SiO]_g[R'RSiO]_h$$

wherein each group R is as defined above, each group R' is independently a member selected from the group consisting of vinyl and allyl, e and f are each an integer of from 0 to 2, provided that $e+f=2$, g is an integer of from 0 to 500, h is an integer of from 0 to 50, provided that $e+h\geq 2$; and (C) a low-viscosity silicone oil having a viscosity of not more than 100 cSt at 25° C., such that 10 to 200 parts by weight of said low-viscosity silicone oil (C) is mixed per 100 parts by weight of the total amount of said organohydrogenpolysiloxane (A) and said organopolysiloxane (B), then polymerizing the mixture by addition polymerization; and
(II) mixing the product of the addition polymerization with a low-viscosity oil having a viscosity of not more than 10 cSt at 25° C.

10. The polishing agent of claim 9, wherein:

$$2\leq b+d\leq 5 \text{ and } 2\leq e+h\leq 5.$$

11. The polishing agent of claim 9, wherein R' is vinyl.

12. The polishing agent of claim 9, wherein said low-viscosity silicone oil (C) is present in an amount of from 20 to 100 parts by weight.

13. The polishing agent of claim 9, wherein said organohydrogenpolysiloxane (A) and said organopolysiloxane (B) are present in amounts such that the ratio of the sum of (b+d) to the sum of (e+h) is from 1:3 to 3:1.

14. The polishing agent of claim 9, wherein said low-viscosity oil having a viscosity of not more than 10 cSt at 25° C. is selected from the group consisting of silicone oils and aliphatic hydrocarbon oils.

15. The polishing agent of claim 9, wherein at least one member of the group consisting of organohydrogenpolysiloxane (A) and organopolysiloxane (B) conforms to the formulas:

$$0.01 \leq \frac{b+d}{2(c+d+3)} \leq 0.2$$

and $$0.01 \leq \frac{e+h}{2(g+h+3)} \leq 0.2.$$

* * * * *